(12) United States Patent
Lovett et al.

(10) Patent No.: US 9,558,675 B2
(45) Date of Patent: Jan. 31, 2017

(54) ANALYTICAL TOOLS FOR EVALUATING STUDENT LEARNING AND PERFORMANCE

(75) Inventors: Marsha C. Lovett, Pittsburgh, PA (US); Christopher R. Genovese, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 83 days.

(21) Appl. No.: 14/239,068

(22) PCT Filed: Aug. 15, 2012

(86) PCT No.: PCT/US2012/050923
§ 371 (c)(1),
(2), (4) Date: Feb. 14, 2014

(87) PCT Pub. No.: WO2013/025791
PCT Pub. Date: Feb. 21, 2013

(65) Prior Publication Data
US 2014/0170626 A1    Jun. 19, 2014

Related U.S. Application Data

(60) Provisional application No. 61/523,592, filed on Aug. 15, 2011.

(51) Int. Cl.
G09B 3/00 (2006.01)
G09B 5/00 (2006.01)
G06Q 10/10 (2012.01)

(52) U.S. Cl.
CPC ............... *G09B 5/00* (2013.01); *G06Q 10/10* (2013.01)

(58) Field of Classification Search
USPC .......................... 434/322, 323, 350
See application file for complete search history.

(56) References Cited

U.S. PATENT DOCUMENTS

| | | | |
|---|---|---|---|
| 2005/0170325 A1* | 8/2005 | Steinberg | G09B 5/00 434/350 |
| 2006/0286533 A1 | 12/2006 | Hansen et al. | |
| 2007/0180428 A1 | 8/2007 | Behrmann et al. | |
| 2010/0190142 A1* | 7/2010 | Gal | G09B 5/00 434/322 |

OTHER PUBLICATIONS

Written Opinion of International Application No. PCT/2012/050923 dated Jan. 24, 2013.
Garcia et al. "Evaluating Bayesian networks precision for detecting students learning styles" Computers & Education 49 (2007) 794-808.
Tselios, et al. "Enhancing user support in open problem solving environments through Bayesian Network inference techniques" Educational Technology & Society, 9 (4), 150-165 (2006).

* cited by examiner

*Primary Examiner* — Kesha Frisby
(74) *Attorney, Agent, or Firm* — K&L Gates LLP

(57) ABSTRACT

In various embodiments, tools, strategies, and techniques are provided for analyzing student performance and learning activity to facilitate enhancing the student experience in different learning environments. A learning analysis system can be provided that uses a statistical analysis framework for making inferences about the level of learning of both individual students and classes of multiple students in association with different knowledge components included in a learning domain.

23 Claims, 11 Drawing Sheets

0. Get KC model, set t = 0
1. Get next data set Yt
2. Find f(θ, k, ψ, s | Y_1,... Y_t) and marginal
3. Find phi_s(c) and store
4. T <- t+1; go to 1

FIG. 4

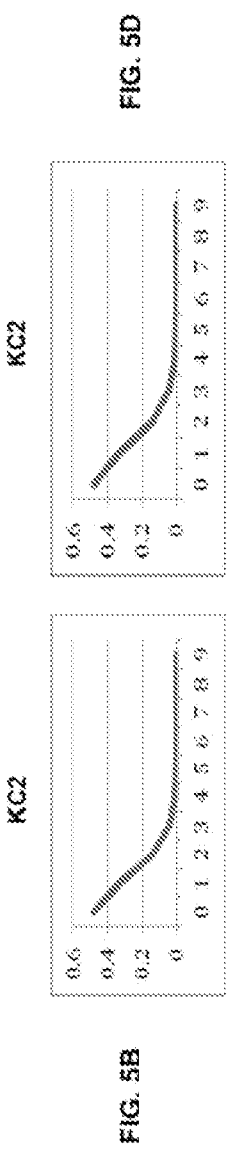

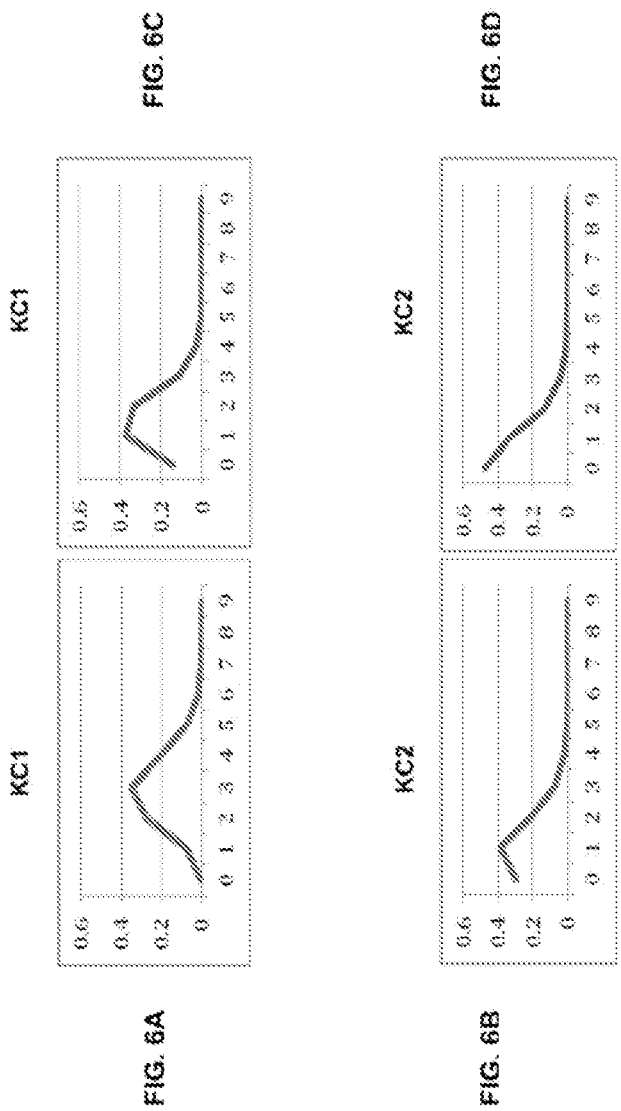

FIG. 8C

ANALYTICAL TOOLS FOR EVALUATING STUDENT LEARNING AND PERFORMANCE

PRIORITY CLAIM

The present application is a U.S. national phase application filed under 35 U.S.C. §371 of International Patent Application No. PCT/US2012/050923, entitled "ANALYTICAL TOOLS FOR EVALUATING STUDENT LEARNING AND PERFORMANCE," filed Aug. 15, 2012, which application, pursuant to 35 U.S.C. §119 (e), claims priority to provisional patent application Ser. No. 61/523,592, entitled "ANALYTICAL TOOLS FOR EVALUATING STUDENT LEARNING AND PERFORMANCE," filed Aug. 15, 2011.

FIELD OF THE INVENTION

Embodiments of the invention described herein generally relate to tools, techniques, strategies, and systems for collecting, processing, and analyzing data collected in association with teaching students in a learning environment.

BACKGROUND

As online education has become more widespread, developing effective practices for providing effective and timely feedback to both instructors and students on student performance and learning has become increasingly more important. However, many of the currently available tools and techniques for providing feedback on student progress are relatively primitive.

For example, in a traditional learning environment, instructors may grade written homework assignments submitted by students and then return the corrected assignments after some delay, perhaps a week later. In learning environments that employ interactive computer-based learning activities, the feedback cycle is typically shorter. Such computer-based systems may be programmed to correct errors in student responses as they are made. For example, when a student answers the question "83−47=?" by typing in "46", the system can recognize and communicate in real-time to the student that the answer of "46" is incorrect. Even though this kind of computer-based feedback is timely and saves instructor effort, it has several serious limitations. First, it deals with only one response at a time, and thus cannot detect patterns in student learning across questions or across time. Second, it processes only one student at a time and so cannot detect similarities across a set of students taking the same course. Third, the instructor is not privy to the full interaction of the student with the teaching system and thus has no opportunity to understand or respond to how students are performing.

In view of the foregoing issues, enhanced tools, techniques and strategies are needed for analyzing student learning and performance in a learning environment, including online and computer-based environments.

BRIEF DESCRIPTION OF THE FIGURES

The utility of the embodiments of the invention will be readily appreciated and understood from consideration of the following description of the embodiments of the invention when viewed in connection with the accompanying drawings, wherein:

FIG. 4 includes an example of a process flow for an update loop that may be executed by an inference engine of a learning analysis system;

FIGS. 5A-7D include examples of statistical distributions associated with student performance in connection with different knowledge components;

FIGS. 8A through 8C include examples of screen displays that may be presented to instructors, students, or other users of a learning analysis system.

DESCRIPTION

Figure 1:
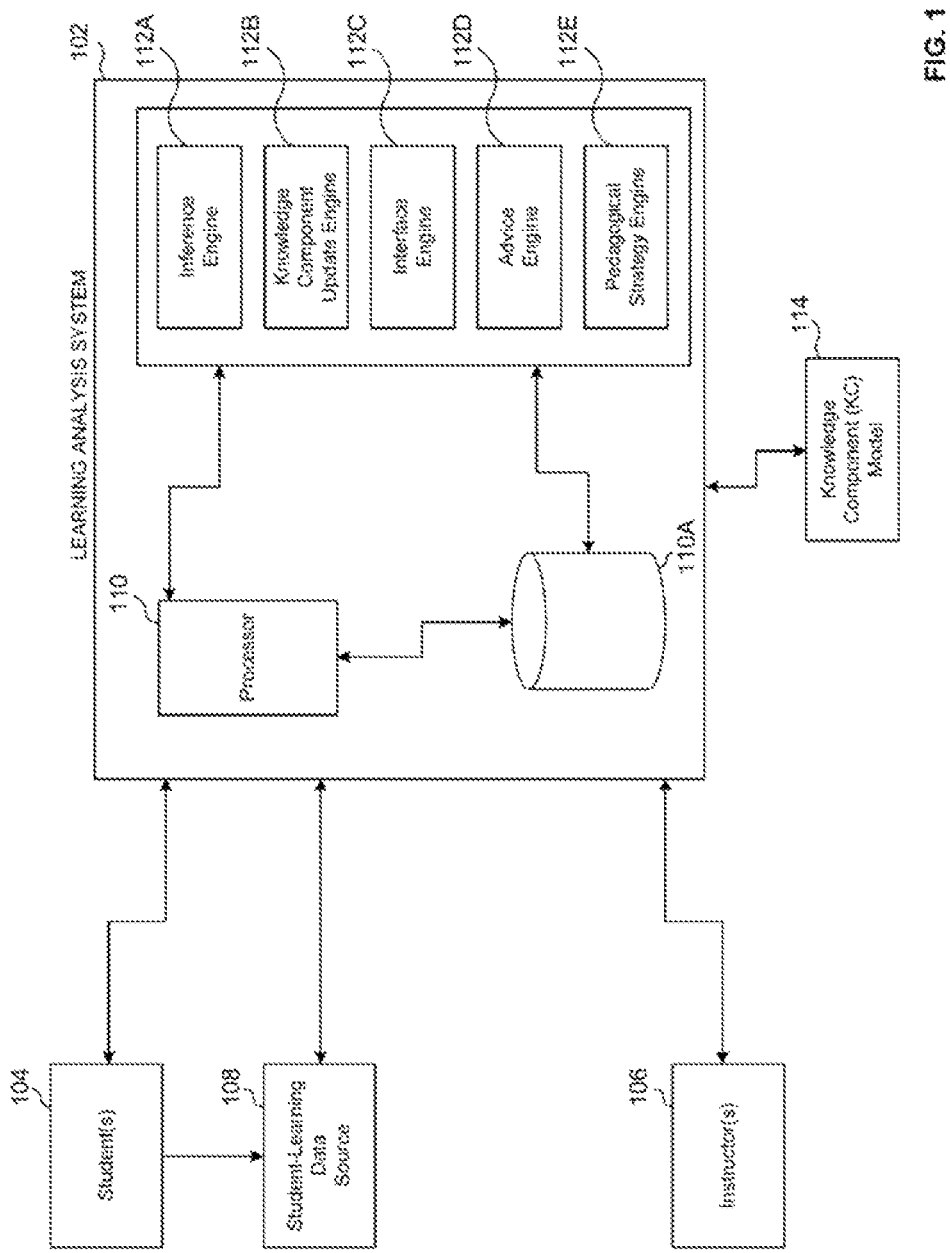
FIG. 1 schematically illustrates an example of a learning analysis system structured in accordance with various embodiments of the invention.

In various embodiments, the invention provides tools, strategies, and techniques for analyzing student performance and learning activity to facilitate enhancing the student experience in different learning environments. The learning environment may be a physical classroom setting, for example, or may be an online or other electronic, computer-based environment.

Various embodiments of a learning analysis system (which sometimes may be referred to herein as a "Learning Dashboard" or "LD") can be structured and programmed to address certain limitations of prior systems and open the next generation of technology for tracking and modeling student learning and offering effective feedback. The learning analysis system can be programmed to collect, store, and analyze data that are generated as students undertake learning activities. The learning analysis system can then communicate the results of its analyses to instructors and/or the students in an illuminating, actionable way. The learning analysis system may be programmed to execute analytical procedures that incorporate statistical modeling techniques which analyze student performance not only relative to each student's individual history but also relative to the responses of the entire population of students studying similar materials or coursework. Therefore, the learning analysis system can be employed to predict what both students and instructors need to know to perform their respective roles more effectively.

As discussed in more detail below, the learning analysis system may be programmed to receive input data associated with student learning activity. For example, such input data may be collected from student interactions with online or computer-based learning environments. The learning analysis system may then analyze the data according to a statistical model that relates students' learning states to their observed performance, a data-informed mapping from the activities completed by students to the different knowledge components required to complete these activities, and/or a mathematical model of how student performance improves with practice on those knowledge components. Analysis performed by the learning analysis system can facilitate predicting each student's current level of learning for each knowledge component. The learning analysis system may also be programmed to present its learning predictions in various ways. For example, the predictions can be organized by a course's learning objectives or displayed as a class distribution, allowing the predictions to inform subsequent action or corrective action by students or instructors. For example, analyses conducted by the learning analysis system may reveal results such as which knowledge components were not well learned across a class of students; which students had achieved comparatively lower levels of learning for a given course learning objective; and/or, which course learning objectives had not been practiced sufficiently. The learning analysis system can also be used to connect learning predictions to the activities undertaken by students, allowing enhanced granularity in assessing student-performance data related to a particular prediction (e.g., student responses to a given activity or set of activities in a learning environment).

For example, the learning analysis system may provide the following kinds of sample feedback to an instructor: 35% of the class is having trouble with borrowing in two-digit subtraction, here are the particular students who show this difficulty and these are the particular questions where students are having most difficulty; 10% of the class has done few or no activities related to two-digit subtraction, here is a list of those students and an indication of which and how many activities each of them has started; or, 55% of the class appears to have learned how to borrow in two-digit subtraction (with a list of those students and their accuracy so far). In another example, the learning analysis system may provide the following kinds of sample feedback to a student: you have begun to learn subtraction of two-digit numbers, but you seem to have trouble when the question involves borrowing, here is some instructional material for you to review, and here are some practice questions for you to work on; you have begun to learn subtraction of two-digit numbers, but you have only answered a few questions on this topic so far, here are the practice questions you have not yet tried; or, you have been working on subtraction of two-digit numbers and appear to have learned borrowing well, if you wish to review or practice further, here are some problems you have not tried yet, or you may wish to go on to the next topic.

FIG. 1 illustrates an example of a learning analysis system 102 structured and programmed in accordance with various embodiments of the invention. As shown, the learning analysis system 102 may be programmed to communicate with one or more students 104 and/or one more instructors 106. In various aspects of its operation, the learning analysis system 102 may receive and use student-learning data 108 associated with performance of the students 104 in a learning environment. The learning analysis system 102 may be programmed to derive and act upon inferences relating to student 104 learning and instruction in a given domain or learning environment. In the example shown, the learning analysis system 102 includes a processor 110 programmed to execute the function of one or more engines 112A-112E. The processor 110 may be one or more of a variety of electronic computer processing systems, servers, or other processing devices. The processor 110 may be operatively associated with one or more data storage media 110A which can be configured to store data and other information collected, processed, or analyzed by the learning analysis system 102. The engines 112A-112E may be embodied as software modules, for example, and/or may include other types of computer-readable components or instructions. An inference engine 112A may be programmed to build, fit, and/or refine a statistical model that provides mathematical representations of the learning state of each student 104, variation in learning among a population of students 104, and/or the learning trajectory for skills as a function of practice by the students 104. A knowledge component update engine 112B may be programmed to update one or more aspects of a knowledge component model 114 as new data derived from student 104 performance are collected. An interface engine 112C may be programmed to formulate and display interactive responses to students 104, instructors 106, and/or other components of the learning analysis system 102. An advice engine 112D may be programmed to identify and communicate useful and timely advice that is appropriate to the current learning state and context of a student 104. A pedagogical strategy engine 112E may be programmed to explore, assess, and/or adapt pedagogical strategies on which to base and communicate advice, with the goal of maximizing the effectiveness of strategies employed by the learning analysis system 102.

As noted above, the learning analysis system 102 may receive input data from a student-learning data source 108 and/or a knowledge component model 114. Data received from the student-learning data source 108 may be used to fit and refine statistical models that enable inferences about student learning, skill difficulty, and pedagogical strategies, among other things. In various embodiments, the knowledge component model 114 may specify, for a given learning environment or learning domain, the set of knowledge components (sometimes referred to herein as "KC" or "KCs") that students are learning. This enables student 104 learning to be tracked and monitored in terms of knowledge components. The knowledge component model 114 may supply the learning analysis system 102 with a mapping for each question or activity presented to a student 104 in the learning environment to one or more knowledge components exercised or tested by each such question or activity.

Many of the components of the learning analysis system 102 involve processes that work with or analyze student-learning data 108. The learning analysis system 102 can receive, process and analyze many kinds of data. One example of such data are clickstream data that can be automatically logged when a student 104 is working within an interactive, computer-based educational resource. The clickstream data capture student-system interactions, e.g., a student 104 clicking on a particular answer choice, typing in some text, requesting a hint, starting or stopping an instructional video, clicking to go to the next page, or any other interaction that the student 104 undertakes with the instructional resource. Each entry for this kind of data may include information on the following: the student 104, including an identifier and various background information; specific instructional tools, questions, or activities that the student 104 accessed; time and duration of the interaction; nature of the student 104 action, with details (e.g., which button was clicked, what text was typed, what object was dragged); and/or, accuracy of the student 104 action (if applicable). In various embodiments, these data entries may be collected in clickstream format so that multiple responses to the same instructional resource can be recognized as separate responses. In addition, the order or sequence in which the student 104 accessed different portions of a computer-based instructional system or display can be captured as a clickstream of student-learning data 108. For example, the student 104 may have first accessed a problem, then a hint section, and then revisited the same problem, which may suggest that the hint section was helpful (especially if the student 104 answered the problem correctly). Examples of sources of such clickstream data include online courses and web-based instructional applications. Data input to the learning analysis system 102 may also include data collected from other instructional technologies, such as personal response systems, cluster computers, or mobile devices (e.g., phones, tablets, laptops, notebooks, personal data assistants, etc.). For example, an instructor 106 may pose a question to a class of students 104, and each student 104 may respond by using a personal response device so that responses from the students 104 can be centrally collected with information about each individual student 104, the question, and other data.

In addition to student-learning data 108 collected from various instructional technology devices, the learning analysis system 102 can be programmed to receive and process human-generated assessments of student 104 work, for example, which may be generated by a human instructor 106 or a teaching assistant. For example, performance by students 104 on class assignments, quizzes, and tests can be converted into input data for the learning analysis system 102. In addition, if an instructor 106 assigned a research project and graded student 104 submissions according to a rubric, the evaluation information could be encoded for use by the learning analysis system 102. The input data may include student information, assignment information (including the various dimensions of the scoring rubric), and/or an instructor 106 rating of the work performed. It can be seen that various actions performed by a student 104 as part the learning process may be encoded as data and submitted as input data to the learning analysis system 102. The above examples are illustrations of the many sources of student-learning data 108 that can be input to and processed by the learning analysis system 102. In various embodiments, input data associated with student actions or performance include information about the student, information on the activity, and/or information on the nature, timing, or accuracy of the performance or action taken by the student 104.

In various embodiments, a knowledge component model 114 may comprise a specification of all the knowledge components (KCs) that a student 104 should learn to perform well in a particular domain, and a mapping from each learning activity provided to students 104 to the set of one or more KCs that is relevant to each learning activity. The underlying assumption is that learning a new domain requires learning a number of pieces of knowledge, e.g., skills, facts, concepts, strategies, relationships, and others which may each represent a specific KC or KCs in the domain. Then, as the student 104 works through a particular instructional activity in that domain (e.g., solves a problem online, answers a test question, responds to a personal response system poll), the student 104 is practicing and learning the KCs associated with completing that activity. The mapping may include one or more KCs per activity, but not necessarily all KCs are mapped to the same activities within the domain. For example, in the domain of multi-column subtraction, there are many facts (e.g., subtraction facts) and skills (e.g., going across columns from right to left, borrowing) that may be deemed required to perform well in this domain. These KCs, at least the ones that students 104 do not already know in advance, are what students 104 learn in the domain. When a student 104 solves a particular multi-column subtraction problem like 83–47, the student 104 is receiving practice at and learning the facts and skills involved in completing that problem (e.g., going right to left, borrowing, and various arithmetic facts).

One of the challenges is to develop a knowledge component model 114 in which the KCs and the activity-to-KC mapping accurately reflect how students 104 learn in the domain. As will be appreciated by those skilled in the art, this can be done in many ways. See, for example, Corbett, A. T., & Anderson, J. R. (1995). Knowledge Tracing: Modeling the Acquisition of Procedural Knowledge. *User Modeling and User-Adapted Interaction*, 4, 253-278; and, Cen, H. Koedinger, K., Junker, B. (2006). Learning Factors Analysis—A General Method for Cognitive Model Evaluation and Improvement. The 8th *International Conference on Intelligent Tutoring Systems*. One example of developing a knowledge component model 114 may involve the following approach. First, a person knowledgeable about the domain specifies a set of KCs that capture the knowledge students should learn in the domain. Next, all the learning activities that will be offered to students as practice or learning opportunities are listed with specific identifiers. A person knowledgeable about the domain specifies a mapping from each learning activity to a set of one or more KCs, namely, to those KCs that are believed to be exercised by completing the given activity. Archival student-learning data 108 may be used to refine the set of KCs and the KC mapping so that the knowledge component model 114 sufficiently accurately captures the way students 104 learn in the domain. The resulting knowledge component model 114, including a set of KCs and KC mapping, may then be received by the learning analysis system 102 as input data.

Figure 2:
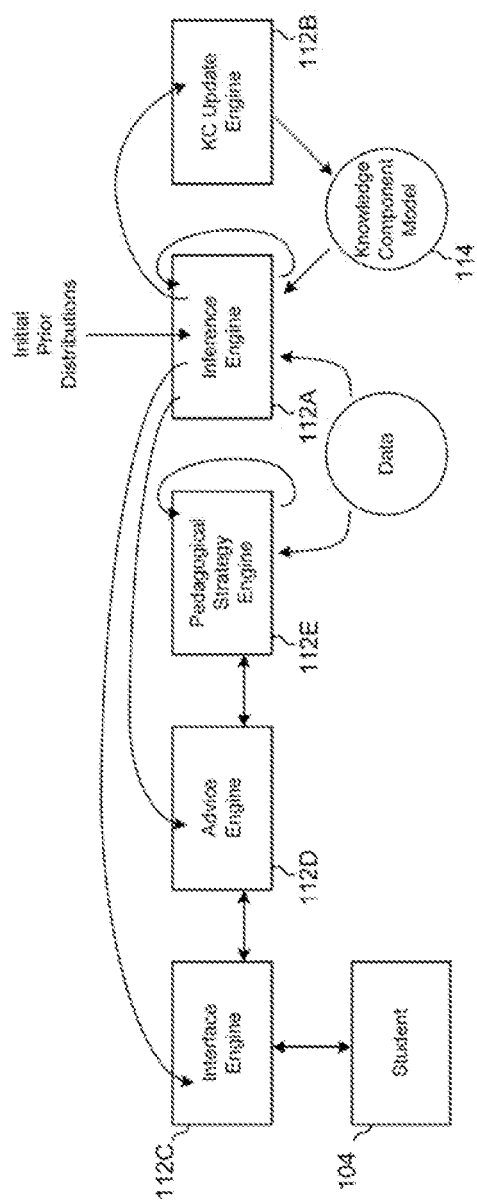
FIG. 2 schematically illustrates an example of how input data and processed data may flow among the various components of the learning analysis system of FIG. 1.

FIG. 2 schematically illustrates an example of how input data and processed data flow among the various components of the learning analysis system 102, including the various engines 112A-112E of the system 102. As shown, arrows reflect information exchange (e.g., parameter estimates, data, KC mapping, etc.). Arrows that cycle out of and back into the same engine 112A-112E reflect that output at one stage of the processing performed by an engine 112A-112E may become input data at a subsequent stage of the processing of the engine 112A-112E.

In various embodiments, the inference engine 112A may be programmed to generate one or more statistical models to understand how well students 104 are learning by making inferences about different, related sets of parameters. Examples of these parameters include the level of learning a student 104 has attained for a given KC, which can be considered the learning state ($\psi$); the skill dynamics relationship between practice and learning for each KC ($\theta$); and, the variability in both previous types of parameters (possibly stratified) across the population of students ($\sigma$). The parameters may be encoded in the learning analysis system 102 as vectors. It can be seen that $\psi$ may be student-specific and KC-specific (i.e., there may be one $\psi$ for each student-KC combination), and $\theta$ may be KC-specific (i.e., there may be one $\theta$ for each KC). The inference engine 112A may be programmed to make inferences based on a hierarchical Bayesian model that describes uncertainty in both the data and the parameters. Each level of the hierarchy may be designed to express the variation in certain of these quantities conditional on others. At the lowest level, the model may specify the distribution of the data given all the parameters. The next levels in the hierarchy may be designed to capture for each student 104 the uncertainty in learning state ($\psi$) with given skill dynamics ($\theta$) and population ($\psi$), which may represent, for example, students in a particular school, course, or semester. Higher levels of the hierarchy may describe variation among different populations and within populations across time.

Figure 3:
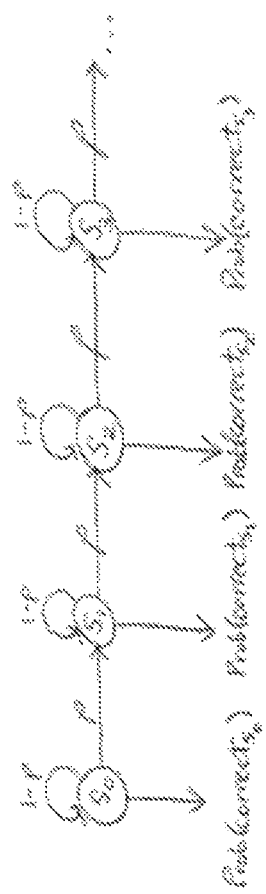
FIG. 3 schematically illustrates an example of a statistical model that may be used in connection with certain embodiments of the invention.

In various embodiments, the lowest levels of the hierarchy may form a hidden model ("HMM") that describes a learning state for an individual student 104 (separately for each student 104 and each KC) in terms of amount of practice and history of performance (e.g., success/failure, latency, number of hints requested for each practice). In one embodiment, the hidden states of the model may be encoded as non-negative integers that represent the effective number of practices that a student has had for a given KC. The observed values of the system are performance, and conditionally on the hidden state, the likelihood of success may be determined by a power law in the hidden state. For example, if n is the hidden state, the probability of an error may be defined as $\gamma_0(1+n)^{-\gamma}$. In the context of this example, $\gamma_0$ and $\gamma_1$ are components of the vector $\theta$. In addition, the model can be programmed to specify transition probabilities between the hidden states. In one embodiment, the learning analysis system 102 may specify a KC-specific probability p of moving from state n to state n+1, given a practice opportunity, with probability 1-p of remaining in the current hidden state, wherein this p would also be part of $\theta$. In another embodiment, a more general model may use time stamps for activities performed by students 104 and has transition probabilities p (as described above) associated with moving from state n to state n+1 and r, wherein r is a function of the time since the last practice, for moving from state n to state n−1. In other words, the learning state of a student 104 can regress as they become "rusty" without practice. Those skilled in the art can appreciate that more general transition probability matrices for the hidden states may offer enhanced flexibility, but they may also introduce a number of additional parameters, and adjustments may be needed to avoid overfitting in the model. FIG. 3 schematically illustrates an example of an HMM structure that may be used in connection with certain embodiments of the invention. As shown, each state $s_i$ may be an unobserved level of learning for a given student 104 and given KC, with transition probabilities (p, 1-p) and specified relationships to predicted performance. It can be appreciated that higher levels in the hierarchy may treat lower level parameters ($\theta$, $\psi$) as conditionally independent draws from a probability distribution that accounts for variation in those parameters among students 104, KCs, and populations. The distributions may be initially chosen according to pilot data and can be sharpened or refined as the learning analysis system 102 collects more data associated with student 104 performance and learning.

An initial step in fitting a model generated by the inference engine 112A is to construct a prior distribution in response to the parameters. For example, a suitable prior distribution may be constructed based on pilot data associated with the student 104, or the population of students 104, from a more generalized database of student 104 date, or by using a Poisson distribution over the hidden states of the model. A variety of prior distributions can be used on the other parameters at the higher levels in the hierarchy. In one embodiment, a low-information reference prior distribution can be used. The conditional distributions and the observed data can facilitate computing updated distributions with a Bayesian analogue of the Viterbi algorithm, for example, as understood by those skilled in the art. See, for example, Rabiner L R (1989). A Tutorial on Hidden Markov Models and Selected Applicants in Speech Recognition. *Proceedings of the IEEE* 77 (2): 257-286. The result of the model fit can yield a posterior distribution over the parameters $\psi$, $\theta$, and $\sigma$. Various marginal posterior distributions may be of interest for different components of the learning analysis system 102. For instance, the learning analysis system 102 may compute the marginal posterior distribution of the learning state $\psi$ for the advice engine 112D and the interface engine 112C. The full posterior distribution may be used as the prior distribution at the next stage (e.g., when the next set of data are fit). It can be seen that a choice of initial prior distributions may become relatively unimportant in this scheme because, as more data are collected, the predictive capacity of the collected data can outweigh the prior distributions in influencing the posterior distribution. As a result, information about the model parameters as recognized by the learning analysis system 102 can grow progressively sharper over time, as more student-learning data 108 are collected.

A schematic description of an example of an update loop that may be executed by the inference engine 112A is illustrated in FIG. 4. In more complicated embodiments of the model, a more sophisticated parameterization of the transitions among hidden states can be provided and quantitative values for the observed responses (e.g., latencies or number of hints) can be specified. Also, one or more conditional distributions at the higher levels of the hierarchy can be refined to better capture variation across students 104 and different populations.

In one example of the processing performed by the inference engine 112A, suppose that students 104 are learning two-digit subtraction. For illustrative purposes, the following two KCs may be used: KC1—moving right to left while subtracting across columns; and, KC2—borrowing 1 from a column to the left to add 10 to the current column. Also, suppose that various subtraction problems (as might be presented in an online computer-based course) have been mapped to these two KCs as follows: Problem1—KC1 and KC2; Problem2—KC1; Problem3—KC1; Problem4—KC1 and KC2; and, Problem5—KC1 and KC2. Further suppose that the inference engine 112A analyzes learning data 108 (suppose it is a binary success or failure for each problem) obtained from two students 104, Student A and Student B. Student A's student-learning data 108 is obtained as follows for five problems answered: correct, correct, incorrect, correct, correct. Likewise, Student B's student-learning data 108 is obtained as follows: incorrect, correct, incorrect (note that Student B attempts problems 1-3 and then stops).

The following table summarizes the obtained student-learning data 108 by skill (wherein "0" represents an incorrect response, and "1" represents a correct response):

| Student | KC1 Accuracy | KC2 Accuracy |
| --- | --- | --- |
| A | 11011 | 111 |
| B | 010 | 0 |

For purposes of this example, suppose that the two students are taken to be similar in skill level (e.g., each have approximately the same math background) and that the prior for $\theta$ is taken to be slightly different for the two skills (e.g., Poisson(5) and Poisson(1)) based on pilot data showing KC1 is easier to learn than KC2. Student B's first data point in the table above shows a failure on problem 1. If the hidden state for that Student B were 0, then the probability of error would be $\gamma_0$; if the hidden state is comparatively larger, then the probability of an error would be lower. In this manner, the student-learning data 108 informs the model about the learning state of the student 104, and as more data is accumulated, the information in the model becomes more refined or sharper. After the learning analysis system 102 obtains each data set, the inference engine 112A follows its processing loop and generates an updated posterior distribution for the parameters.

In the context of this example, FIGS. 5A-5D show the marginal posterior distribution of $\psi$ for each student and each KC for successive updates. FIGS. 5A and 5B illustrate the distributions for Student A, on a KC-by-KC basis, prior to Student A attempting the problems to be solved. Likewise, FIGS. 5C and 5D illustrate the distributions for Student B, on a KC-by-KC basis, prior to Student B attempting the problems to be solved. It can be seen that initially within each KC the students have the same posterior distributions, because there has been no data processed yet and the prior distributions for each student were approximately the same.

With reference to FIGS. 6A-6D, after the students solve the first three problems, the posterior distributions begin to diverge because Student A has had more success than Student B (especially on KC1). FIGS. 6A and 6B illustrate the distributions for Student A after the first three problems have been attempted. Likewise, FIGS. 6C and 6D illustrate the distributions for Student B after the first three problems have been attempted.

Figure 7A:
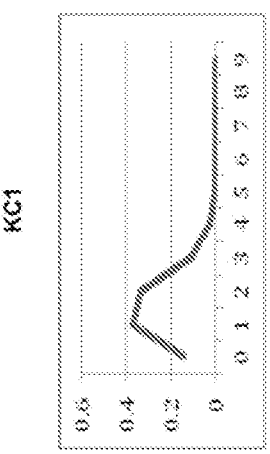
Figure 7B:
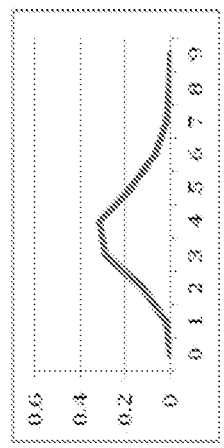
Figure 7C:
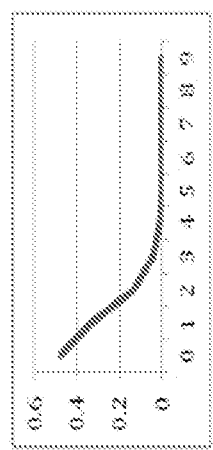
Figure 7D:
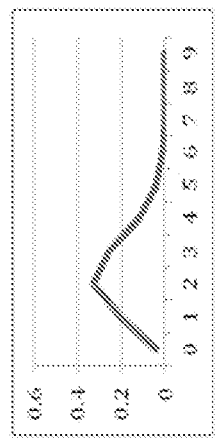

As reflected in FIGS. 7A-7D, after five problems have been attempted (or not attempted in the case of Student B), the posterior for Student A has more mass in the higher learning states as a result of Student A's additional and successful practice (see FIGS. 7A and 7B), whereas the posterior distribution for Student B has stayed the same because that student did not attempt any more problems (see FIGS. 7C and 7D). It can be appreciated that with application of a more complex model, the posterior distribution for Student A could regress due to decay of learning. The posterior distributions can be fed back to the inference engine 112A as prior distributions for the update processing in connection with a subsequent set of student-learning data 108. Also, the posterior distribution on the learning state may be communicated for processing by the interface engine 112C and/or the advice engine 112D.

It can be seen that useful features of the inference engine 112A of the learning analysis system 102 include, among others: using a sophisticated framework for inferring the level of learning for each student 104 with each KC rather than merely summarizing student performance; producing a distribution over the learning states from which both point estimates and assessments of uncertainty can be derived; providing up-to-the-moment analyses that incorporate available student learning interaction rather than being subject to a delay between assessment (e.g., paper tests or written assignments) that result in stale information; adapting and improving its own inferences over time as more student-learning data 108 become available; and, improving inferential performance by borrowing strength across problem instances (for a given student 104), students, and time.

As described above, a knowledge component model 114 may include two components: a set of KCs for the domain, and a mapping from activities to the KCs that they exercise. In various embodiments, rather than treating the mapping from activities to KCs as binary (i.e., each KC is exercised or not by a given activity), the knowledge component update engine 112B of the learning analysis system 102 can be programmed to map each activity to a vector of weights with one weight per KC. The magnitude of each weight (e.g., between 0 and 1) can be designed to measure the degree to which a KC is exercised in the given activity. The use of non-binary KC mappings has a significant advantage in that it can allow the learning analysis system 102 to update the weights based on data for adjusting the KC mapping over time, making it more accurate and useful. In certain embodiments, the update engine 112B may perform adjustments in an automated way, whereas past work in revising a KC model has typically required human involvement.

In various embodiments, the learning analysis system 102 incorporates updating of the KC weights into the model executed by the inference engine 112A. The inventors have discovered that given the often large number of parameters this requires and the computationally intensive nature of the weight updating process, it can be more effective to do this periodically when more data have accrued. Moreover, the weights themselves may be shared among multiple students 104, so it can be advantageous to fit across a large body of student 104 data. It can be appreciated that the learning analysis system 102 may use strong prior distributions on the KC weights so that small sample results are not unduly variable. The processing of the update engine 112B can periodically regenerate the posterior distributions by using an added level to the model hierarchy. This added level can be used to represent the KC weights, although it may not be included in the comparatively more frequent updates performed by the inference engine 112A. Because KC models are often generated by humans (i.e., by a person who is an expert in the domain), the KC models may not necessarily provide the most accurate representation of knowledge in a domain. It can be seen that the update engine 112B addresses issues arising from uncertainty in the knowledge component model 114. When supplied with a sufficiently large set of KCs in the knowledge component model 114, the update engine 112B can function to compensate for at least part of the human error associated with an initial knowledge component model 114 and potentially discover a more accurate one.

In one example of the operation of the update engine 112B, suppose that the knowledge component model 114 submitted to the learning analysis system 102 for the two-digit subtraction scenario now includes KC3 to represent the specific skill of subtracting 0 from the other digit in a given column. Suppose that KC3 has been mapped to problem 2 which asked students to subtract 30 from 49. Even though this problem 2 involves subtracting 0 from 9 in the rightmost column (leading an expert to reasonably make that mapping), KC3 may nonetheless not be very important to student 104 performance on that problem, especially when compared to the importance of KC1. In this example, the update engine 112B could adjust the knowledge component model 114 for this domain in response to student-learning data 108 by adjusting the weight for Problem 2—KC3 to have a comparatively smaller weight than the weight applied to Problem 2—KC1, for example.

In various embodiments, the advice engine 112D of the learning analysis system 102 provides the capability to communicate helpful information to users, even when that information has not been specifically requested. For example, the advice engine 112D may be programmed to alert the instructor 106 and/or the student 104 whenever a student 104 falls below a specified threshold on a quantitative learning measure, such as a predicted hidden state in the HMM (as described above). The advice engine 112D may generate a suggested set of exercises for the student 104 to perform that will address gaps in the comprehension level of the student 104. In certain embodiments, other analyses conducted by the advice engine 112D allow the learning analysis system 102 to detect patterns in student 104 responses across a class of multiple students 104. For example, the advice engine 112D may be programmed to alert the instructor 106 when a certain proportion of the class is showing weakness on a particular KC or group of KCs, which may be manifested by falling below a predefined threshold performance distribution. In another example, the advice engine 112D may generate individualized assignments by classifying student 104 needs using a temporal pattern of student 104 performance, studying, and/or practice. Also, the advice engine 112D may monitor whether a student 104 has a tendency to skip activities of a certain kind and yet has not demonstrated sufficient learning in that area. The advice engine 112D can suggest that the student 104 revisit one or more of the skipped activities, or to revisit a subset of the skipped activities that could support enhanced learning by the student 104. In certain embodiments, the advice engine 112D can be programmed to implement one or more learning or instructional strategies that include metacognitive advice such as when a student 104 seems to be guessing at answers. This might be indicated by data associated with a threshold error rate and/or relatively quick latencies. In this example, the advice engine 112D may suggest that the student 104 take more time to get questions right the first time or may suggest that the student 104 request a hint when unsure of what to do next when solving a problem. In operation, the advice engine 112D can be programmed to execute one or more background threads, each of which may be tasked with detecting a particular pattern in the data and then executing a corresponding action protocol when its pattern is detected.

In the context of the two-digit subtraction examples described herein, suppose that the majority of a class of students 104 is doing well on two-digit subtraction, because the learning analysis system 102 has determined that 17 out of 20 students have achieved a threshold level of learning for a "borrowing" knowledge component. Also suppose that of the three underperforming students 104, one has solved only a few subtraction problems that involve borrowing, and the other two have solved a number of borrowing problems but have made many errors and have taken an unacceptably long time to solve those problems. As a result, for the latter two students 104, the inference engine 112A has reported a posterior distribution for the learning state of the borrowing KC that is heavily concentrated toward low levels. One of the threads executed by the advice engine 112D has been monitoring student-learning data 108 to identify this condition, including identifying students 104 whose posterior expected learning state for a given KC is below a specific threshold, $\tau$. The advice engine 112D may include an action protocol associated with this thread to alert the instructor 106 that these students 104 are having difficulty on the given KC and to present the students 104 with a suggested set of exercises designed to target the KC for which their learning state is low. In this example, the latter two students 104 would receive an appropriate message from the advice engine 112D and a list of "borrowing" problems to perform.

In various embodiments, the advice engine 112D may be programmed with a set of pedagogical strategies, with each represented by a condition-action pair, for example. The condition matches temporal patterns of student performance in the data, and the action specifies what the learning analysis system 102 should do when a condition is met. In certain embodiments, the pedagogical strategy engine 112E may be configured to monitor the effectiveness of the various pedagogical strategies employed by the learning analysis system 102. The pedagogical strategy engine 112E may function to compare measures of the actual effects of one or more strategies to their predicted outcomes, in order to identify which strategies are working sufficiently well and which ones are not. In certain embodiments, for those strategies found to be in need of improvement, the pedagogical strategy engine 112E can update or refine the strategies to make them more effective or to cease their implementation altogether, for example. The pedagogical strategy engine 112E may devise and execute one or more mini-experiments in which the parameters of the current strategy are perturbed to create new or modified strategies. New or modified strategies can then be communicated to the advice engine 112D for execution. In addition, the pedagogical strategy engine 112E can then analyze the effectiveness of the new strategy as compared to the original strategy or a previously implemented strategy.

In the example presented above with respect to the advice engine 112D (i.e., wherein advice was given to the students 104 whose estimated learning level for the borrowing KC was below threshold $\tau$), the value of the threshold is an example of a parameter that the pedagogical strategy engine 112E can adjust and explore. For purposes of illustration, suppose that the two students receiving advice under that pedagogical strategy did not show the desired behavior or improved performance. The pedagogical strategy engine 112E could then identify the strategy as needing improvement and hence develop variations of it to include in the set of strategies used by the advice engine 112D. For example, one new strategy could be included with a comparatively lower threshold and a second new strategy could be included with a comparatively higher threshold. Then, by monitoring the effectiveness of this new set of related strategies, the pedagogical strategy engine 112E can identify which threshold tends to be most effective. In other words, the pedagogical strategy engine 112E can adjust the condition part of a pedagogical strategy so that its action is triggered at a point when the student 104 can maximize the use of assistance—not too "early" (when the student 104 is having little or no difficulty) and not too "late" (when the student has been struggling for an unacceptably long period of time and might have tried other things or given up in the interim).

The inventors have recognized that one of the realities in the world of online education is that much student 104 learning takes place outside of the classroom. To that end, the learning analysis system 102 can be configured for communication with students 104, instructors 106, and other users through a variety of media venues. For example, the learning analysis system 102 can send messages to students and instructors via e-mail, text, SMS, mobile applications, course management systems, and/or web-based media such as social networking sites or cloud-based repositories. Communicated data and other information may be delivered to a variety of systems or devices that can be used to access the learning analysis system 102. Examples of such access devices include computer systems, laptops, notebooks, tablets, mobile phones, or personal data assistants, among many others. The devices may communicate through a wireless or wireline connection to the learning analysis system 102, through an Internet connection, an intranet connection, an extranet connection, or other suitable communication architecture. An advantageous aspect of the design of the communication strategy of the learning analysis system 102 is its ability to provide timely, interactive, and actionable information. In certain embodiments, one aspect of this communication strategy is providing a consistent presentation style and user interface across the various platforms, communication media, and/or access devices.

Figure 8A:
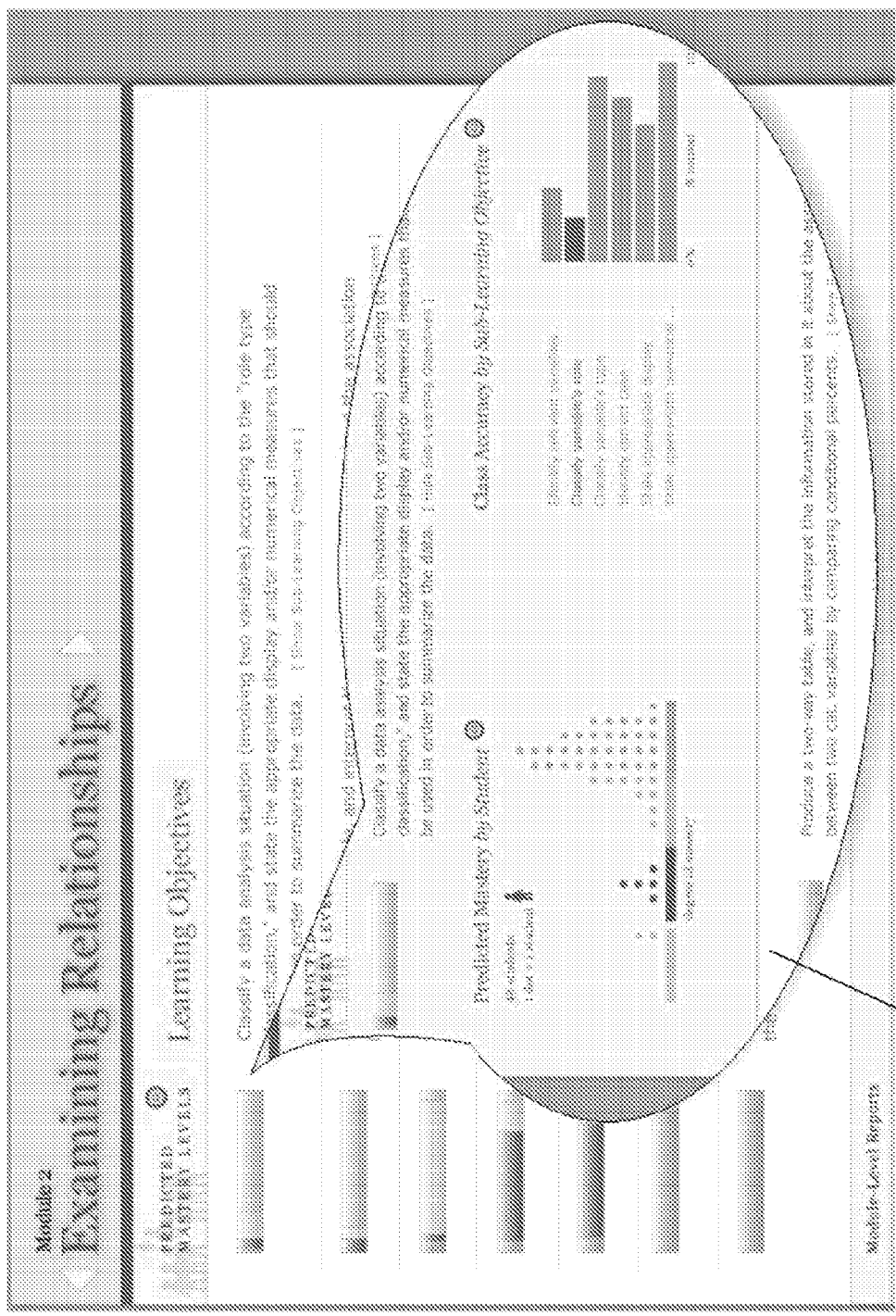
Figure 8B:
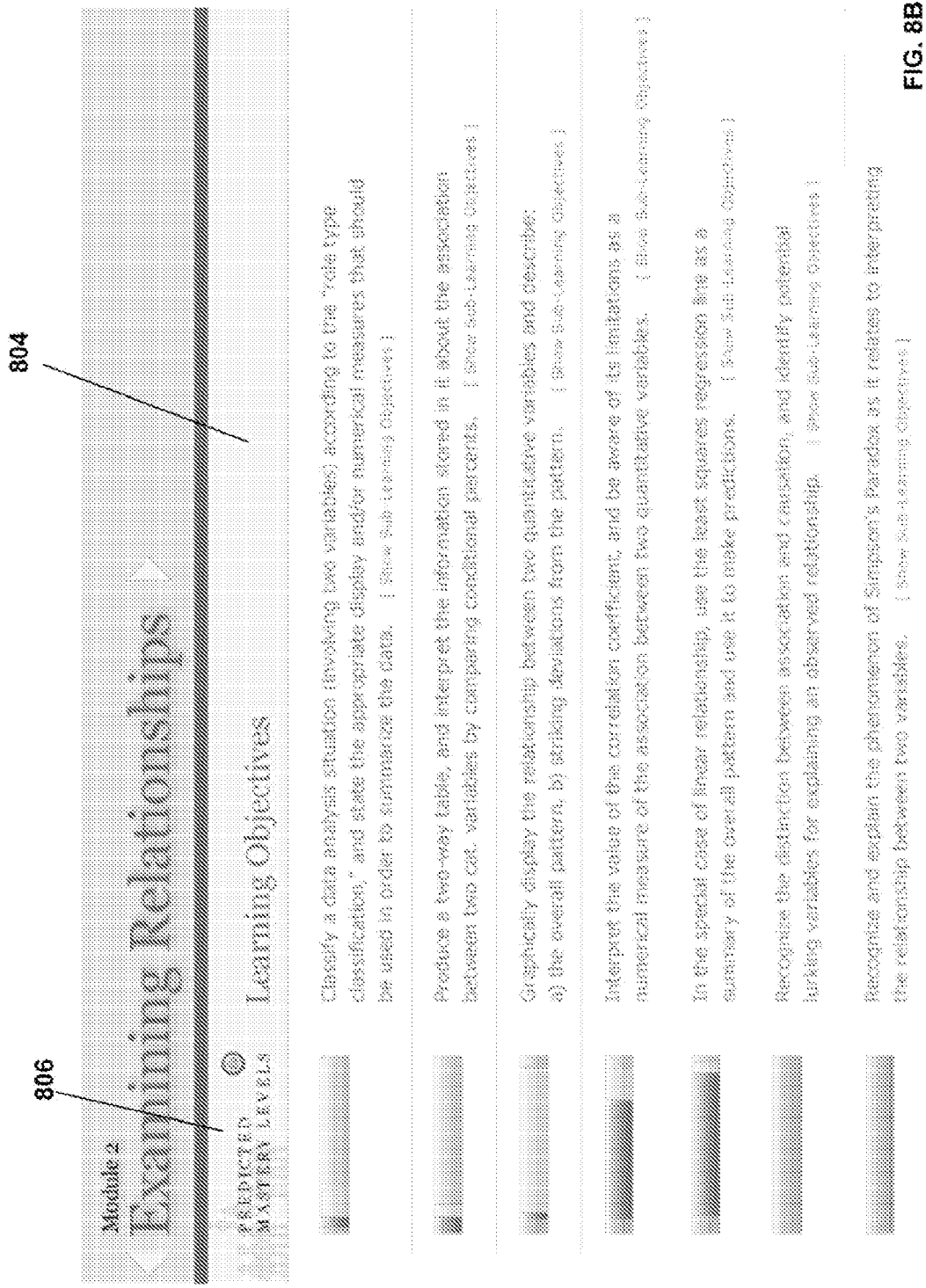
Figure 8C:
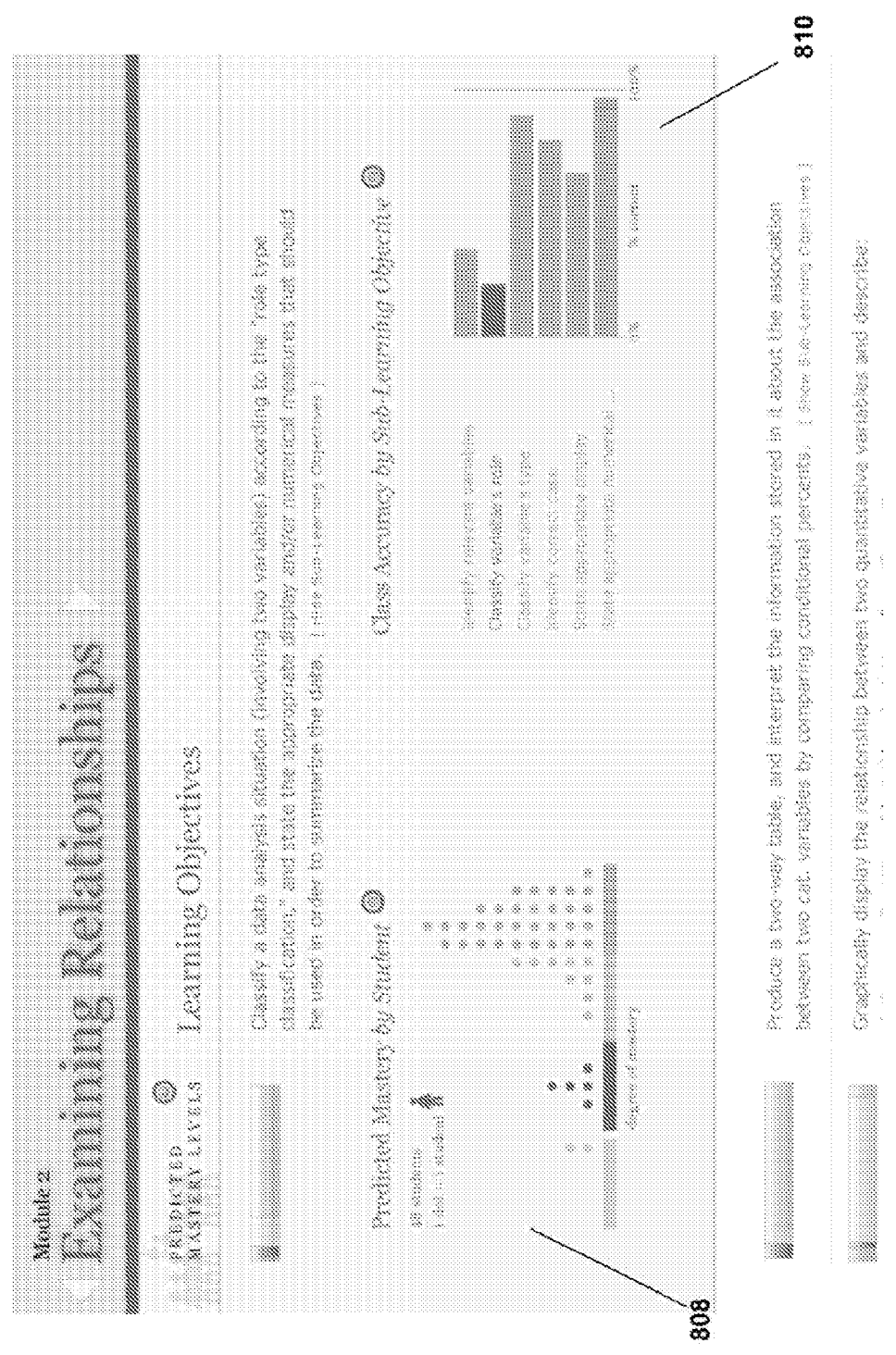

With reference to the sample screen displays of FIGS. 8A through 8C, the interface engine 112C of the learning analysis system 102 can be programmed to provide a flexible platform for presenting a variety of analyses, results, and instructional protocols. The interface engine 112C may be responsible for creating the displays that are presented to the user through whatever communication media the user has selected; managing communications between the system 102 and the user to enable an interactive user interface; and, managing communication among the various components of the system 102 (e.g., "pushing" a piece of pedagogical advice from the advice engine 112D to a student 104 via the interface engine 112C). FIG. 8A provides an example of a screen display that can be presented to the user (e.g., an instructor 106) through a computer screen. FIG. 8A displays an overview of how well the class is learning seven learning objectives associated with the current module, for example. When the instructor 106 clicks on one of those objectives, a more detailed display of student 104 learning and performance can also be presented (e.g., see section 802 of FIG. 8A). It can be appreciated that other sub-sections may be accessed through the screen display to allow the user to obtain more detailed information on specific skills or students, for example. FIG. 8B includes a screen display listing examples of learning objectives 804 and associated predicted mastery levels 806 displayed for each learning objective 804. FIG. 8C includes a screen display that illustrates an example of a distribution display section 808 that represents predicted mastery on a student-by-student basis. Also, a section 810 is provided that displays a graphical representation of accuracy for sub-learning objective for a class of multiple students 104.

Figure 9:
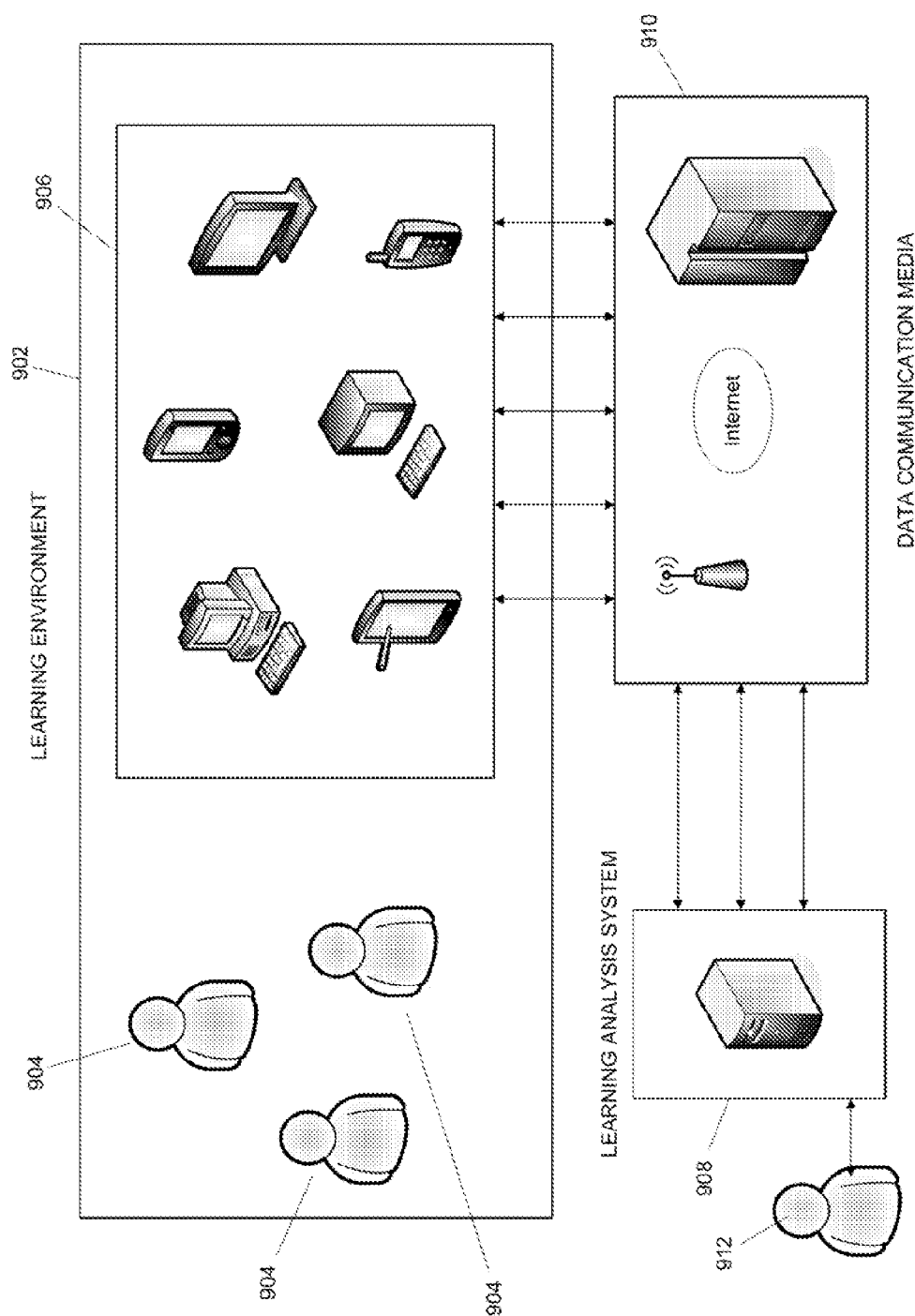
FIG. 9 includes an example of a data communication architecture illustrating interaction between various access devices in a learning environment and a learning analysis system.

With reference to FIG. 9, in certain embodiments of the invention, a learning environment 902 may be provided as an interactive, computer-based educational resource for student learning. The learning environment 902 may be associated with one or more students 904 employing one or more different types of access devices 906 configured to receive and process student-learning data associated with educational tasks performed by the students 904 in the learning environment 902. It can be appreciated that the learning environment 902 may or may not be defined by physical facility parameters or geographic boundaries. For example, one or more of the multiple students 904 need not be physically present in the same classroom to be considered part of the learning environment 902. Examples of access devices 906 include a variety of computer-based tools including, without limitation, personal response systems, cluster computers, mobile devices (e.g., phones, smart phones, tablets, laptops, notebooks, personal data assistants, etc.), desktop computers, mainframe-based computing environments, web servers, or many other types of computer-based devices or systems.

A learning analysis system 908 can be configured and programmed for data communication with one or more of the access devices 906 associated with the learning environment 902 through one or more types of communication media 910. For example, the communication media 910 may include wireless data connections, Internet or cloud-based data connections, a wireline data connection, and/or a reasonable combination thereof. In certain embodiments, the learning analysis system 908 and the learning environment 902 can each be structured to interact in a way that allows the learning analysis system 908 to receive multiple streams of student-learning data from a class of multiple students or a single student, for example, performing the same or related educational tasks. In one example, the learning analysis system 908 may be programmed to process and analyze multiple streams of student-learning data automatically (such as in accordance with various analytical methods and algorithms described herein) to provide information about the student 904 learning process to an instructor 912, for example. As described above, in various embodiments the learning analysis system 908 can be programmed to provide a flexible platform for presenting a variety of analyses, results, and instructional protocols to an instructor 912 in the form of screen displays and other learning dashboard tools, for example.

An example of student-learning data that can be received and processed by the learning analysis system 908 is clickstream data that can be automatically logged when a student 904 is working on an access device 906 to perform an educational task within the learning environment 902. For example, the clickstream data may capture student-system interactions, e.g., a student 904 clicking on a particular answer choice, typing in some text, requesting a hint, starting or stopping an instructional video, clicking to go to the next page, or any other interaction that the student 904 undertakes with the instructional resource. The data may include information about the student 904, including an identifier and various background information; specific instructional tools, questions, or activities that the student 904 has accessed; time and duration of the interaction; nature of the student 904 action, with details (e.g., which button was clicked, what text was typed, what object was dragged); and/or accuracy of the student 904 action (if applicable). In various embodiments, data entries may be collected in clickstream format so that multiple responses to the same instructional resource can be recognized as separate responses. In addition, the order or sequence in which the student 904 has accessed different portions of a computer-based instructional system or display can be captured as a clickstream of student-learning data. Examples of sources of such clickstream data also include online courses and web-based instructional applications that students 904 may access and through the access devices 906.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention. The arithmetic examples employed herein are intended to illustrate embodiments of the invention for those skilled in the art. Also, the phrasings presented in the samples of feedback provided by the learning analysis system 102 are for illustrative purposes only, meant to represent the kind of information that the learning analysis system 102 may provide, and not meant to imply that feedback messages are necessarily phrased in that manner. In various embodiments, the learning analysis system 102 may communicate information in graphical ways in addition to or in lieu of text feedback.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A learning analysis system for analyzing student performance and learning activity in a learning environment, the system comprising:
   a monitor;
   an electronic computer processor in communication with the monitor, wherein the processor is programmed to execute the function of an inference engine, wherein the inference engine is programmed to receive at least the following input data based on interaction, by students, with a computer-based learning environment that comprises at least one access device, wherein the input data comprises clickstream data received via the at least one access device, and the inference engine is programmed to calculate:
   (a) student-learning data based on the clickstream data, wherein the student learning data is associated with the students performing at least one activity in the learning environment, and
   (b) knowledge component model data based on the clickstream data, wherein the knowledge component model data comprises a mapping of at least one knowledge component to the at least one activity to be performed by the students in the learning environment;
   wherein the inference engine is further programmed to generate, in response to the student learning data and the knowledge component model data, at least one of a statistical probability distribution or a point estimate for at least the following components of a statistical model:
   (a) a learning state parameter representing a level of learning each of the students has attained for at least one knowledge component, wherein the at least one knowledge component comprises a predetermined number of skills, facts, concepts, strategies, or relationships regarding subject matter within a learning domain and is specific to an individual student,
   (b) a skill dynamics parameter representing a relationship between practice and the learning state parameter for the at least one knowledge component, wherein the skill dynamics parameter is specific to an individual knowledge component, and
   (c) a variability parameter representing variability in the learning state parameter and the skill dynamics parameter across the students;
   wherein the electronic computer processor is programmed to provide a screen display on the monitor that displays a plurality of learning objectives, wherein at least one of the plurality of learning objectives provides an interactive link in the screen display that, when activated by a user, causes the monitor to display a graphical representation of a student learning and performance metric based on the statistical model; and
   wherein the graphical representation of the at least one student learning and performance metric comprises information illustrating at least one of which knowledge component of a plurality of knowledge components were not well learned across the students, which students achieved comparatively lower levels of learning for a given learning objective, or which learning objective had not been practiced sufficiently.

2. The system of claim 1, wherein the inference engine is further programmed to generate the statistical model based on a hierarchical Bayesian model.

3. The system of claim 1, wherein the inference engine is further programmed to generate the statistical model by constructing at least one of a prior distribution or a posterior distribution in response to at least one of the learning state parameter, the skill dynamics parameter, the variability parameter, or a combination thereof.

4. The system of claim 1, further comprising an advice engine programmed to monitor the at least one student learning and performance metric to identify when a condition associated with a posterior expected learning state for a given knowledge component meets a specified criterion.

5. The system of claim 1, further comprising a pedagogical strategy engine programmed to compare a measure of an actual effect of at least one pedagogical strategy to a predicted outcome for the at least one pedagogical strategy.

6. The system of claim 1, further comprising a knowledge component update engine programmed to adjust at least a portion of the knowledge component model data in response to the student-learning data by adjusting at least one weight associated with at least one knowledge component.

7. The system of claim 1, further comprising an interface engine programmed to display an interactive response associated with an individual student in response to a communication from at least one other engine or a query from a student or an instructor.

8. The system of claim 1, further comprising an interface engine programmed to display an interactive response associated with multiple students in response to a communication from at least one other engine or a query from a student or an instructor.

9. The system of claim 1, wherein the student-learning data include data indicative of an activity accessed by the students in a computer-based learning environment.

10. The system of claim 1, wherein the student-learning data include data indicative of a sequence in which the students accessed multiple portions of a computer-based instructional system.

11. A method for analyzing student performance and learning activity in a learning environment, the method comprising:
receiving, with a learning analysis system including at least one electronic computer processor, input data based on interaction, by students, with the learning analysis system, wherein the input data comprises clickstream data;
calculating the following:
  (a) student-learning data based on the clickstream data, wherein the student learning data is associated with the students performing at least one activity in the learning environment,
  (b) knowledge component model data based on the clickstream data, wherein the knowledge component model data comprises a mapping of at least one knowledge component to at least one activity to be performed by the student in the learning environment;
generating, with an inference engine of the learning analysis system, in association with the student-learning data and the knowledge component model data, a statistical probability distribution or a point estimate for at least the following components of a statistical model:
  (a) a learning state parameter representing a level of learning the student has attained for at least one knowledge component, wherein the at least one knowledge component comprises a predetermined number of skills, facts, concepts, strategies, or relationships regarding subject matter within a learning domain and is specific to an individual student,
  (b) a skill dynamics parameter representing a relationship between practice and the learning state parameter for the at least one knowledge component, wherein the skill dynamics parameter is specific to an individual knowledge component, and
  (c) a variability parameter representing variability in the learning state parameter and the skill dynamics parameter across the students; and
providing, via a monitor, a screen display that displays a plurality of learning objectives, wherein at least one of the plurality of learning objectives provides an interactive link in the screen display that, when activated by a user, causes the monitor to display a graphical representation of a student learning and performance based on the statistical model;
wherein the graphical representation of the at least one student learning and performance comprises information illustrating at least one of the following:
  which knowledge component of a plurality of knowledge components were not well learned across the students;
  which students achieved comparatively lower levels of learning for a given learning objective; and
  which learning objective had not been practiced sufficiently.

12. The method of claim 11, further comprising generating the statistical model based on a hierarchical Bayesian model.

13. The method of claim 11, further comprising generating the statistical model by constructing at least one of a prior distribution or a posterior distribution in response to at least one of the learning state parameter, the skill dynamics parameter, the variability parameter, or a combination thereof.

14. The method of claim 11, further comprising monitoring the student-learning data to identify when a condition associated with a posterior expected learning state for a given knowledge component is below a specific threshold.

15. The method of claim 11, further comprising comparing a measure of an actual effect of at least one pedagogical strategy applied in the learning analysis system to a predicted outcome for the at least one pedagogical strategy.

16. The method of claim 11, further comprising adjusting at least a portion of the knowledge component model data in response to the student-learning data by adjusting at least one weight associated with at least one knowledge component.

17. The method of claim 11, further comprising displaying an interactive response associated with an individual student in response to a communication from at least one other engine or a query from a student or an instructor.

18. The method of claim 11, further comprising displaying an interactive response associated with multiple students in response to a communication from at least one other engine or a query from a student or an instructor.

19. The method of claim 11, further comprising receiving student learning data include data indicative of an activity accessed by the students in a computer based learning environment.

20. The method of claim 11, further comprising receiving student learning data indicative of a sequence in which the students accessed multiple portions of a computer-based instructional system.

21. A learning analysis system for analyzing student performance and learning activity in a learning environment, the system comprising:
an electronic computer processor programmed to execute the function of an inference engine;
wherein the inference engine is programmed to receive at least the following input data based on interaction, by students, with a computer-based learning environment that comprises a plurality of access devices, wherein the input data comprises clickstream data, and the inference engine is programmed to calculate:
  (a) student-learning data based on the clickstream data, wherein the student learning data is associated with the students performing at least one activity in a learning environment, (b) knowledge component model data based on the clickstream data, wherein the knowledge component model data comprises a mapping of at least one knowledge component to the at least one activity to be performed by the students in the learning environment;

wherein the inference engine is further programmed to generate, in response to the student-learning data and the knowledge component model data, at least one of a statistical probability distribution or a point estimate for at least the following components of a hierarchical Bayesian statistical model, wherein the hierarchical Bayesian model comprises a first and a second hierarchy level that describe variation for the following components over a predetermined amount of time, wherein the first hierarchy level comprises a hidden Markov model specifying transition probabilities between a plurality of hidden states and the second hierarchy level describes variation between a first population of the students and a second population of the students:

(a) a learning state parameter representing a level of learning the student has attained for at least one knowledge component, wherein the at least one knowledge component comprises a predetermined number of skills, facts, concepts, strategies, or relationships regarding subject matter within a learning domain and is specific to an individual student, (b) a skill dynamics parameter representing a relationship between practice and the learning state parameter for the at least one knowledge component, wherein the skill dynamics parameter is specific to an individual knowledge component, and (c) a variability parameter representing variability in the learning state parameter and the skill dynamics parameter across the students; and wherein the electronic computer processor is further configured for automatically processing student-learning data communicated as multiple streams of data received from one or more computer-based access devices associated with the students in the learning environment;

wherein the electronic computer processor is programmed to provide a screen display on the monitor that displays a plurality of learning objectives, wherein at least one of the plurality of learning objectives provides an interactive link in the screen display that, when activated by a user, causes the monitor to display a graphical representation of a at least one student learning and performance based on the hierarchical Bayesian statistical model; and wherein the graphical representation of the at least one student learning and performance comprises information illustrating at least one of the following:
  which knowledge component of a plurality of knowledge components were not well learned across the students;
  which students achieved comparatively lower levels of learning for a given learning objective; and
  which learning objective had not been practiced sufficiently; and wherein the graphical representation of the at least one student learning and performance further comprises an indication of a predicted mastery level for each of the plurality of knowledge components and for each of the plurality of learning objectives.

22. The system of claim 1, wherein the graphical representation of the at least one student learning and performance comprises information illustrating at least one of which knowledge component of a plurality of knowledge components were not well learned across the students, which students achieved comparatively lower levels of learning for a given learning objective, or which learning objective had not been practiced sufficiently.

23. The method of claim 11, wherein the graphical representation of the at least one student learning and performance comprises information illustrating at least one of which knowledge component of a plurality of knowledge components were not well learned across the students, which students achieved comparatively lower levels of learning for a given learning objective, or which learning objective had not been practiced sufficiently.

* * * * *